United States Patent Office 3,642,961
Patented Feb. 15, 1972

3,642,961
INJECTION MOLDING PROCESS FOR
INHIBITING PROPELLANT
John A. Sutphin, Lakewood, Colo., and Marlen G. Whippen, Succasunna, N.J., assignors to Hercules Incorporated, Wilmington, Del.
No Drawing. Filed June 12, 1968, Ser. No. 736,253
Int. Cl. B29f 1/10; C08b 21/00; C09j 3/04
U.S. Cl. 264—3                                    13 Claims

ABSTRACT OF THE DISCLOSURE

Propellant grains are inhibited by injection molding of an inhibitor material prepared from a low flow temperature thermoplastic polymer about the surface of the propellant grain wherein the said grain has been primed with a lacquer comprising a film-forming polymer selected from the group consisting of ethyl cellulose having an ethoxy content of from 43% to about 50%, cellulose acetate and cellulose acetate butyrate and the inhibitor material is chosen from the same polymer type as the said primary lacquer polymer.

This invention relates to an economical process of inhibiting large numbers of small propellant grains. More particularly, this invention relates to a process of injection molding of a thermoplastic inhibitor material on the peripheral surface of a propellant grain.

Many methods have been employed for inhibiting surfaces of propellant grains, some of which are still in use. One such method consists of wrapping the longitudinal peripheral surface of a grain with a plastic inhibitor tape and bonding the tape to the grain with a solvent. The ends of the grain which are not inhibited by this wrapping method are inhibited by adhesively securing plastic inhibitor discs to the ends of the grain. This process is not desirable for inhibiting large numbers of small grains because of the multiple steps involved and the associated labor costs.

Another method employed to inhibit propellant grains consists of casting propellant into a preformed inhibitor and curing the propellant whereby an inhibited grain results. This method, while completely suitable for large grains, is not adaptable for inhibiting large numbers of small grains because of the complexity and cost of the casting equipment, the complex manual operations involved, and the difficulty of removing air from small propellant castings.

Another method for inhibiting propellant grains consists of passing a strand of propellant through a crosshead extruder from which inhibiting material is molded onto the strand surface. The strand is then cut into small grains. The ends of the grains are inhibited with inhibitor discs. This method is costly because of the distinct process steps necessary to inhibit the grain.

Still another known method for inhibiting grains includes casting a curable inhibitor around the surface of propellant grain to be inhibited. The inhibitor is then cured and the inhibited grain removed from the mold. This method is impractical for inhibiting large numbers of small grains since large numbers of precision molds and extensive curing facilities are required.

Broadly, in accordance with this invention a process for inhibiting small propellant grains is provided which comprises priming a propellant with a priming lacquer comprised of a film-forming thermoplastic polymer and a solvent therefor, drying the primed propellant grain, positioning the resulting primed propellant grain in a mold sized so as to provide a cavity about the grain, injection molding a thermoplastic polymer into said cavity, and cooling the thermoplastic polymer to its solid state whereby an inhibitor results which is securely bonded to the propellant grain.

The priming lacquers employed to prime the propellant grain prior to injection molding are prepared by dissolving a film-forming thermoplastic polymer selected from the group consisting of ethyl cellulose, cellulose acetate, and cellulose acetate butyrate, in a solvent therefor. The film-forming polymers are generally employed in the form of a powder compounded with a suitable plasticizer employed with the film-forming polymer of the priming lacquer varies from about 5% to about 35% by weight based on the weight of the compounded film-forming polymer. The compounded film-forming polymer employed in the priming lacquer can vary from about 1% to about 15% by weight and is preferably from about 5% to about 7% by weight based on the weight of the priming lacquer. When the priming lacquer contains less than about 1% of compounded film-forming polymer a poor-bond often results between the propellant grain and the thermoplastic inhibitor material. The amount of priming solvent can vary from about 99% to about 85% by weight based on the weight of the priming lacquer.

The priming lacquers are prepared by dissolving the film-forming polymer containing suitable plasticizer into a solvent therefor. Illustrative solvents employed to prepare the priming lacquer using ethyl cellulose as the film-forming polymer include ethyl acetate, butyl acetate, propyl acetate, ethyl lactate, butyl lactate, acetone, methyl ethyl ketone, dioxane, ethyl cellosolve, methyl cellosolve, and the like. Mixtures of two or more of the above solvents can be employed if desired.

Suitable plasticizers for use with ethyl cellulose include phthalate esters such as dimethyl phthalate, diethyl phthalate, dibutyl phthalate, diphenyl phthalate; miscellaneous esters such as methyl abietate, amyl oleate, butyl oleate, dibutyl sebecate, butyl stearate; vegetable oils such as castor oil, corn oil, and linseed oil; phosphate esters such as tricresyl phosphate, triethyl phosphate, triphenyl phosphate; amides such as dibutyllauramide, diethyldiphenylurea; fatty acids such as oleic acid, stearic acid, tung acid; fatty alcohols such as cetyl alcohol, myristyl alcohol, stearyl alcohol; mineral oils; and the like. Mixtures of two or more of the above plasticizers can be employed if desired.

Illustrative solvents employed to prepare the priming lacquer using cellulose acetate as the film-forming polymer include diacetone alcohol, methyl Cellosolve, ethyl Cellosolve, butyl acetate, ethyl acetate, methyl ethyl ketone, and the like. Mixtures of two or more of the above solvents can be employed if desired. Suitable plasticizers for use with cellulose acetate include dimethyl phthalate, diethyl phthalate, dibutyl phthalate, methyl phthalyl, ethyl glycolate, para-toluene sulfonamide, para-toluene sulfonate, triacetin, tripropionin, dibutyl tartrate, triphenyl phosphate and the like.

Illustrative solvents employed to prepare the priming lacquer when using cellulose acetate butyrate as the film-forming polymer include ethyl acetate, butyl acetate, methyl Cellosolve, acetone, methyl ethyl ketone, diacetone alcohol, and the like. Mixtures of two or more of the above solvents can be employed if desired. Suitable plasticizers for cellulose acetate butyrate include high boiling organic esters such as methyl abietate, butyl and glycol esters of the higher fatty acids, such as butyl oleate, diethyl adipate, dibutyl adipate, diethyl phthalate, dibutyl phthalate, tricresyl phosphate, triphenylphosphate, and the like.

The thermoplastic polymers which can be employed as the inhibitors in this invention are thermoplastic polymers selected from the group consisting of ethyl cellulose, cellulose acetate, and cellulose acetate butyrate. These thermoplastic polymers are employed in the form of molding powder in which the polymer is compounded with a suitable plasticizer or mixture of plasticizers. Plasticizers or mixtures of plasticizers heretofore described for the respective film-forming polymers can be employed. The molding powder can contain from 90% to about 60% by weight of the thermoplastic polymer and from about 10% to about 40% by weight of plasticizer. The plasticizers impart flowability properties on the thermoplastic polymers at elevated temperatures, but not at temperatures at which they function as inhibitors. In general, the greater percentage of plasticizer employed, the lower the temperature at which the thermoplastic polymer will flow.

The preferred thermoplastic polymer for use as an inhibitor is ethyl cellulose. The ethyl cellulose employed must have an ethoxy content within the range between about 43% and 50%. Preferably the ethoxyl content of the ethyl cellulose is from about 46% to about 49.5%.

The priming lacquer employed with the thermoplastic inhibitor material must contain a film-forming polymer of the same polymer type as the thermoplastic polymer comprising the inhibitor material. Thus when employing a priming lacquer containing ethyl cellulose as the film-forming polymer, the inhibitor polymer employed must be ethyl cellulose. In like manner, when employing a priming lacquer containing cellulose acetate or cellulose acetate butyrate as the film-forming polymer, the inhibitor polymer employed must be cellulose acetate and cellulose acetate butyrate respectively.

In preparing a propellant grain for injection molding the propellant grain is first primed with the priming lacquer heretofore described. The propellant grain is coated with the priming lacquer by any convenient method such as by dipping, brushing, spraying, or wiping. The entire surface of the propellant grain which is to be inhibited is contacted with the priming lacquer. Excess lacquer is drained from the surface of the primed grain and the grain is dried to remove a substantial amount of priming lacquer solvent from the surface of the grain. The primed propellant grain should be substantially dry to the touch so that it can be readily handled and positioned within the mold of the injection molding apparatus. For most of the solvents described, an optimum drying time is from about one-half hour to about one hour at ambient temperature. At these drying conditions some residual solvent will be present on the surface of the primed grain which results in an optimum propellant-inhibitor bond after injection molding. Longer drying times of the primed grain can result in a poor quality propellant-inhibitor bond. At elevated drying temperatures shorter drying times are possible. It is within the skill of those versed in the art to determine a suitable drying time-temperature relationship by priming a propellant grain, drying it, injection molding the inhibitor about the grain, and then inspecting the grain for separation between the inhibitor and the propellant grain surface. A qualitative determination of the quality of the propellant-inhibitor bond can be made by manually attempting to strip the inhibitor from the propellant. The ultimate test of the propellant-inhibitor bond is in the ballistic performance of the inhibited propellant.

Following the priming and drying operations, the propellant grain is positioned within a mold designed for use with an injection molding apparatus. The mold is sized so as to provide a cavity about the surface of the propellant grain. The thickness of the inhibitor of the propellant grain is determined by the extent of the cavity about the grain. The mold is designed so that the propellant grain can be centrally positioned therein. The mold is preferably prepared in two half-sections. When inhibiting a propellant grain having a central perforation, each half-section of the mold will contain a spindle centrally positioned within the mold, said spindle having a substantially identical configuration as the perforation of the propellant grain to be inhibited. When the mold is closed, i.e., the half-sections are joined together, the spindle from each half-section will come together to form an essentially continuous spindle through the center of the mold. It is preferable that the central spindle of each half-section be sized so that the spindles are in approximate contact with each other when the mold is closed although a small gap between the spindles in the closed mold is permissible. The purpose of the spindle is to provide support throughout the entire length of the perforation of propellant grain. This support is necessary to prevent deformation of the propellant grain under the pressures and temperatures of the inhibiting operation. If this support is not provided the propellant grain may deform during the inhibiting operation resulting in a propellant grain having a non-uniform inhibitor thickness.

For most inhibiting applications it will be desired to inhibit both the peripheral surface and ends of the propellant grain. Thus, a cavity must be provided about the ends of the grain as well as the peripheral surface of the grain. One suitable method for providing such a cavity, is to include a collar on each spindle at the closed end of the mold half-sections heretofore described. These collars prevent the propellant grain from contacting the ends of the mold, when the mold half-sections are joined together in a closed position. In this way, a cavity is provided around both the longitudinal peripheral surface of the propellant grain as well as the ends of the grain.

The following examples will more fully illustrate this invention. All parts and percentages are by weight unless otherwise specified.

EXAMPLE 1

A priming lacquer is prepared by admixing 38 parts of ethyl cellulose, 12 parts of plasticizer for ethyl cellulose and a solvent which is a mixture of 361 parts of ethyl lactate, and 589 parts of normal butyl acetate. The propellant grain to be inhibited is comprised of 51.5% nitrocellulose, 38.4% nitroglycerin, 3.3% plasticizer and 6.8% additives. Auto-ignition tests on this propellant show that it can withstand a temperature of 380° F. for two minutes prior to ignition. The propellant grain is brushed with priming lacquer, excess lacquer is drained from the surface of the grain, and the grain is dried at ambient temperature for about 30 minutes. During this drying period most of the solvent evaporates from the surface of the grain leaving a primed grain which is substantially dry to the touch. The primed grain is positioned on the spindle of the moveable half-section of a propellant mold designed for use with a commercially available injection molding machine. The movable half-section of the mold is closed against the stationary half-section of the mold which forms an integral part of the injection molding apparatus.

The injection molding machine contains a reservoir which is filled with ethyl cellulose molding powder formulated with 24% by weight of plasticizers. The molding powder is heated to a temperature of about 350° F. in this reservoir. At this temperature the molding powder is in the molten state. The molten inhibitor is injected into the cavity of the mold surrounding the propellant grain at a pressure of about 4200 p.s.i. This pressure is maintained on the mold for about ten seconds after the cavity of the mold has been filled with molten inhibitor. Following the injection step the injection pressure is released and the mold is held in a closed position for an additional twenty seconds. During this period sufficient cooling takes place for the inhibitor material to solidify. The mold is then opened and the inhibited propellant grain is ejected.

Visual inspection of the resulting inhibited grain shows that there are no areas of discontinuity between the propellant grain surface and the inhibitor. The inhibitor cannot be manually stripped from the grain further illustrating a good propellant-inhibitor bond. There is no deformation of the inhibited propellant grain, and there is a uniform thickness of inhibitor about the propellant surface.

The following example illustrates the need of priming the propellant grain in order to obtain a propellant-inhibitor bond.

EXAMPLE 2

Example 1 is repeated employing identical molding conditions, thermoplastic inhibitor, and propellant grain composition. No priming lacquer, however, is employed. Following injection molding the propellant grain is removed from the mold. Visual inspection of the grain shows that there is no propellant-inhibitor bond. The inhibitor is readily stripped from the propellant grain.

The following example illustrates the excellent propellant-inhibitor bond resulting from the injection molding process of this invention.

EXAMPLE 3

Example 1 is repeated with all steps and materials being identical. Twenty-three propellant grains are inhibited following this process. These grains have a diameter of 1.30 inches and a length of 0.93 inch. Visual inspection of these grains shows no propellant-inhibitor discontinuities. The inhibited grains are loaded into heavy-weight static motor hardware, and static fired. The results of the test-firings of these grains is recorded in the table. These results show no eratic burning rates or high pressures illustrating the excellent propellant-inhibitor bond obtained.

The propellant grain compositions which can be inhibited by the process of this invention can vary widely from the propellant composition set forth in the examples. Single base, double base, triple base, and composite type propellants can be inhibited. It is, however, necessary to determine the propellant time-temperature relationship at which ignition of the propellant grain to be inhibited will occur prior to employing the process of this invention. The propellant time-temperature relationship at which ignition occurs is defined herein as the auto-ignition temperature and is meant to also include the temperature at which spontaneous ignition of the propellant takes place. The thermoplastic inhibitor must be formulated so that the auto-ignition time-temperature relationship for the propellant is not exceeded. Furthermore, it is necessary that the pressure to which the propellant is subjected during injection molding must be less than the compressive strength of the propellant, and that this pressure should not cause substantial and permanent deformation to the propellant. Thus, it is apparent that the physical properties of the propellant are an important factor in determining whether or not the process of this invention can be employed to inhibit a propellant.

In the injection molding operation described in the foregoing examples conventional molding equipment, molds and molding techniques are employed. It is necessary during injection molding to properly vent the cavity about the propellant grain, to insure that there will be substantially no air contained in the solidified inhibitor. If desired, the cavity about the propellant grain can be evacuated prior to injection molding.

To prevent deformation of the propellant grain during the injection molding operation it is preferable that the molten inhibitor material be fed into the cavity surrounding the propellant grain through two or more symmetrically spaced gates on the periphery of the mold. In general these gates should be positioned approximately at the center of the cavity which is to be filled with inhibitor. Other possible methods of gating can be used which essentially distribute pressure uniformly over the entire surface of the propellant grain.

The inhibiting process of this invention while particularly advantageous for inhibiting both the peripheral surface and ends of a small propellant grain in one operation is not so limited. Thus, if desired, the peripheral surface of a portion of the peripheral surface can be inhibited without inhibiting the ends of the grain, or the ends of the grain alone can be inhibited. Only minor changes in the TABLE.—STATATIC MOTOR TESTING OF PROPELLANT GRAINS* INHIBITED WITH INJECTION MOLDED ETHYL CELLULOSE

| | Propellant grain Number | | | | | | | | | | | | | | | | | | | | | | |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| P$_{max.}$ (lbs. p.s.i.) | 2,485 | 2,505 | 2,514 | 2,356 | 2,441 | 2,241 | 2,468 | 2,390 | 2,228 | 2,306 | 2,360 | 2,412 | 2,322 | 2,380 | 2,536 | 2,340 | 2,484 | 2,481 | 2,324 | 2,421 | 2,623 | 2,446 | 2,618 |
| T=(time of burning in secs.) | .464 | .468 | .468 | .469 | .484 | .479 | 4.78 | .484 | .492 | .479 | .470 | .466 | .476 | .471 | .475 | .478 | .462 | .458 | .460 | .450 | .455 | .450 | .443 |

*Grains preconditioned and fired at 70° F.

mold are required to provide a cavity in a mold about that part of the propellant grain to be inhibited by the process of this invention.

Still another advantage of the process of this invention is that the mold into which the inhibitor is injected can be continually reused without the necessity of removing the mold from the injection molding apparatus and placing the mold in a heated chamber for curing the inhibitor. This is possible since the inhibiting materials employed in this process are thermoplastic polymers which do not require a curing step to cause them to solidify.

As will be evident to those skilled in the art, various modifications can be made or followed in light of the foregoing disclosure and discussion without departing from the spirit and scope of this disclosure or from the scope and spirit of the claims.

What we claim and desire to protect by Letters Patent is:

1. A method for inhibiting small propellant grains by an injection molding process comprising,
   (a) priming the propellant grain with a priming lacquer, said priming lacquer comprising a film-forming polymer selected from the group consisting of ethyl cellulose having an ethoxy content of from about 43% to about 50%, cellulose acetate and cellulose acetate butyrate, said priming lacquer containing at least 1% by weight of the film-forming polymer.
   (b) drying the primed propellant grain to remove a substantial amount of the priming lacquer solvent from the surface of the primed propellant grain,
   (c) positioning the primed grain in a mold, said mold being sized to provide a cavity about the propellant grain,
   (d) injecting a flowable inhibitor material into the mold cavity at a temperature below the auto-ignition temperature of the propellant grain and at a pressure below which substantial and permanent deformation of the grain will occur, said inhibitor material comprising a thermoplastic polymer selected from the group consisting of ethyl cellulose having an ethoxy content of from about 43% to about 50%, cellulose acetate, and cellulose acetate butyrate, the thermoplastic polymer comprising the inhibitor being of the same polymer type as the film-forming polymer in the primary lacquer.
   (e) cooling the injected inhibitor material whereby the inhibitor material solidifies about the propellant grain forming a strong inhibitor-propellant bond, and
   (f) recovering an inhibited propellant grain.

2. The method of claim 1 wherein the inhibitor polymer and film-forming polymer are comprised of ethyl cellulose having an ethoxy content of from about 43% to about 50%.
3. The method of claim 2 wherein the priming lacquer solvent is comprised of a mixture of ethyl lactate and normal butyl acetate.
4. The method of claim 3 wherein the propellant grain is prepared from double base propellant.
5. The method of claim 3 wherein the propellant grain is prepared from a composite type propellant.
6. The method of claim 1 wherein the inhibitor polymer and film-forming polymer are comprised of cellulose acetate.
7. The method of claim 6 wherein the propellant grain is prepared from double base propellant.
8. The method of claim 6 wherein the propellant grain is prepared from composite type propellant.
9. The method of claim 7 wherein the solvent for the priming lacquer is comprised of methyl Cellosolve.
10. The method of claim 1 wherein the inhibitor polymer and film-forming polymer are comprised of cellulose acetate butyrate.
11. The method of claim 10 wherein the propellant grain is prepared from double base propellant.
12. The method of claim 10 wherein the propellant grain is prepared from composite type propellant.
13. The method of claim 10 wherein the priming lacquer is comprised of methyl Cellosolve.

References Cited
UNITED STATES PATENTS

| | | | |
|---|---|---|---|
| 2,468,233 | 4/1949 | Prichard | 264—217 |
| 2,576,797 | 11/1951 | Lyons | 106—196 |
| 2,706,262 | 4/1955 | Barnes | 106—196 |
| 2,877,504 | 3/1959 | Fox | 264—279 |
| 2,890,615 | 6/1959 | Le Febvre | 264—328 |
| 2,916,776 | 12/1959 | O'Neill Jr. et al. | 264—3 |
| 3,338,990 | 8/1967 | Rice et al. | 264—328 |
| 3,405,201 | 10/1968 | Roach | 264—328 |

ROBERT F. WHITE, Primary Examiner

J. R. THURLOW, Assistant Examiner

U.S. Cl. X.R.

106—169, 198; 264—135, 217, 275, 328, 331